US012713468B2

(12) United States Patent
Park

(10) Patent No.: US 12,713,468 B2
(45) Date of Patent: Aug. 18, 2026

(54) METHOD AND APPARATUS FOR PERFORMING RANDOM ACCESS PROCEDURE FOR COVERAGE ENHANCEMENT

(71) Applicant: KT CORPORATION, Gyeonggi-do (KR)

(72) Inventor: Ki-hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/346,722

(22) Filed: Jun. 14, 2021

(65) Prior Publication Data

US 2021/0392699 A1 Dec. 16, 2021

(30) Foreign Application Priority Data

Jun. 12, 2020 (KR) ........................ 10-2020-0071584
May 24, 2021 (KR) ........................ 10-2021-0065898

(51) Int. Cl.
*H04W 74/0833* (2024.01)
*H04W 72/1268* (2023.01)
*H04W 72/23* (2023.01)
*H04W 74/00* (2009.01)
(Continued)

(52) U.S. Cl.
CPC ... *H04W 74/0841* (2013.01); *H04W 72/1268* (2013.01); *H04W 72/23* (2023.01); *H04W 74/006* (2013.01); *H04W 74/0833* (2013.01); *H04W 74/0891* (2013.01); *H04W 74/0838* (2024.01)

(58) Field of Classification Search
None
See application file for complete search history.

(56) References Cited

U.S. PATENT DOCUMENTS

2016/0295609 A1 10/2016 Vajapeyam et al.
2017/0273113 A1 9/2017 Tirronen et al.
2018/0070282 A1* 3/2018 Su ........................ H04W 72/30
(Continued)

FOREIGN PATENT DOCUMENTS

KR 10-2017-0134398 A 12/2017
WO 2020/060075 A1 3/2020
WO 2021/226360 A1 11/2021

OTHER PUBLICATIONS

Ericsson, "NB-IoT-Remaining issues for random access procedure", R1-161836, 3GPP TSG-RAN WG1 NB-IoT Ad-Hoc Meeting, Sophia Antipolis, France, Mar. 22-24, 2016.
(Continued)

*Primary Examiner* — Jutai Kao
(74) *Attorney, Agent, or Firm* — IP Legal Services, LLC

(57) ABSTRACT

Provided are a method and an apparatus for performing a random access procedure for coverage enhancement. The method of a user equipment (UE) for performing a random access procedure for coverage enhancement may include transmitting a random access channel preamble (RACH Preamble) for repeated transmission of Msg3 through a Physical Random Access Channel (PRACH), receiving a random access response (RAR) including uplink scheduling information for the repeated transmission of the Msg3, and repeatedly transmitting the Msg3 based on the uplink scheduling information.

3 Claims, 13 Drawing Sheets

(51) Int. Cl.
*H04W 74/08* (2024.01)
*H04W 74/0838* (2024.01)

(56) References Cited

U.S. PATENT DOCUMENTS

| | | | | |
|---|---|---|---|---|
| 2020/0120709 | A1 | 4/2020 | Bergquist et al. | |
| 2020/0252962 | A1 | 8/2020 | Vajapeyam et al. | |
| 2020/0329508 | A1 | 10/2020 | Tirronen et al. | |
| 2021/0051707 | A1* | 2/2021 | Rastegardoost | H04W 72/23 |
| 2021/0352689 | A1 | 11/2021 | Jung et al. | |
| 2021/0352712 | A1* | 11/2021 | Ly | H04W 76/11 |
| 2021/0352735 | A1* | 11/2021 | Bae | H04W 72/1268 |
| 2021/0360660 | A1* | 11/2021 | Cozzo | H04L 1/1887 |

OTHER PUBLICATIONS

European Patent Office, European Search Report of corresponding EP Patent Application No. 21179137.1, Jan. 4, 2022.
European Patent Office, Office Action of corresponding EP Patent Application No. 21179137.1, Nov. 16, 1 2022.
Korean Intellectual Property Office, Office Action of corresponding KR Patent Application No. 10-2021-0065898, Feb. 24, 2026.

* cited by examiner

One frame, $T_{frame}$ = 10ms
One subframe, $T_{subframe}$ = 1ms
#0
#1
#2
#3
#4
#5
#6
#7
#8
#9
One slot, 1ms
One slot, 0.5ms
One slot, 0.25ms
One slot, 0.125ms
One slot, 0.0625ms
Δf = 15kHz
Δf = 30kHz
Δf = 60kHz
Δf = 120kHz
Δf = 240kHz

FIG.8
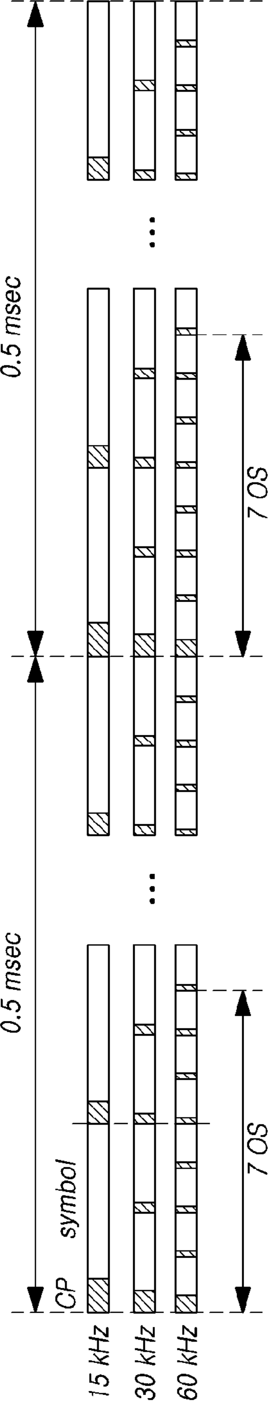

METHOD AND APPARATUS FOR PERFORMING RANDOM ACCESS PROCEDURE FOR COVERAGE ENHANCEMENT

CROSS REFERENCE TO RELATED APPLICATION

This application claims priority from Korean Patent Application No. 10-2020-0071584 filed on Jun. 12, 2020 and Korean Patent Application No. 10-2021-0065898 filed on May 24, 2021, both of which are hereby incorporated by reference for all purposes as if fully set forth herein.

BACKGROUND

Field

The present disclosure relates to a method and apparatus for performing a random access procedure for coverage enhancement in a next-generation radio access network (hereinafter, referred to as "new radio or NR").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, sub-frame, Transmission Time Interval (TTI), etc.) as a method for efficiently satisfying each usage scenario requirement through a frequency band constituting any NR system.

In consideration of this aspect, it is necessary to design a random access procedure for coverage enhancement.

BRIEF SUMMARY

The present disclosure provides a method and apparatus for repeatedly transmitting a message 3 (Mesg3) in a random access procedure to enhance coverage enhancement in the NR environment.

According to one aspect, a method of a user equipment (UE) may be provided for performing a random access procedure for coverage enhancement. The method includes transmitting a random access channel preamble (RACH Preamble) for repeated transmission of message 3 (Msg3) through a Physical Random Access Channel (PRACH), receiving a random access response (RAR) including uplink scheduling information for the repeated transmission of the Msg3, and repeatedly transmitting the Msg3 based on the uplink scheduling information.

According to another aspect, a method of a base station may be provided for performing a random access procedure for coverage enhancement. The method includes receiving a random access channel preamble (RACH Preamble) for repeated transmission of message 3 (Msg3) through a Physical Random Access Channel (PRACH), transmitting a random access response (RAR) including uplink scheduling information for the repeated transmission of the Msg3, and repeatedly receiving the Msg3 based on the uplink scheduling information.

According to still another aspect, a user equipment (UE) may be provided for performing a random access procedure for coverage enhancement. The user equipment includes a transmitter configured to transmit a random access channel preamble (RACH Preamble) for repeated transmission of message 3 (Msg3) through a Physical Random Access Channel (PRACH), a receiver configured to receive a random access response (RAR) including uplink scheduling information for the repeated transmission of the Msg3, and a controller configured to control an operation of the transmitter and the receiver. The transmitter may repeatedly transmit the Msg3 based on the uplink scheduling information.

According to still another aspect, a base station may be provided for performing a random access procedure for coverage enhancement. The base station includes a receiver configured to receive a random access channel preamble (RACH Preamble) for repeated transmission of message 3 (Msg3) through a Physical Random Access Channel (PRACH), a transmitter configured to transmit a random access response (RAR) including uplink scheduling information for the repeated transmission of the Msg3, and a controller configured to control an operation of the transmitter and the receiver. The receiver may repeatedly receive the Msg3 based on the uplink scheduling information.

According to the disclosed embodiments, it is possible to repeatedly transmit a message 3 (Mesg3) in a random access procedure to enhance coverage enhancement in the NR environment

DESCRIPTION OF DRAWINGS

The above and other aspects, features, and advantages of the present disclosure will be more apparent from the following detailed description taken in conjunction with the accompanying drawings, in which:

FIG. 8 is a view illustrating an example of symbol level alignment among different subcarrier spacings (SCSs) in accordance with embodiments of the present disclosure;

DETAILED DESCRIPTION

Figure 1:
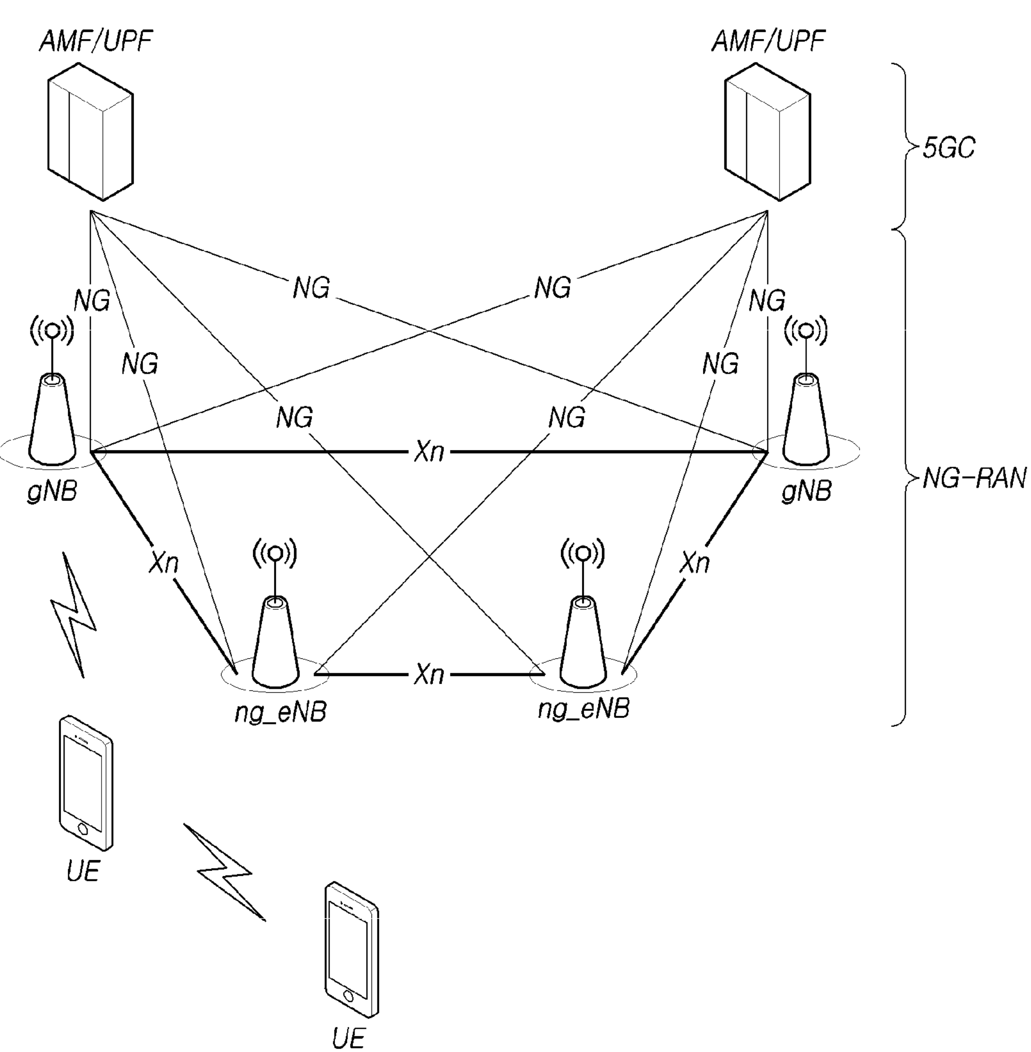
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user UE (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC UE, an M2M UE, or a URLLC UE, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT)-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
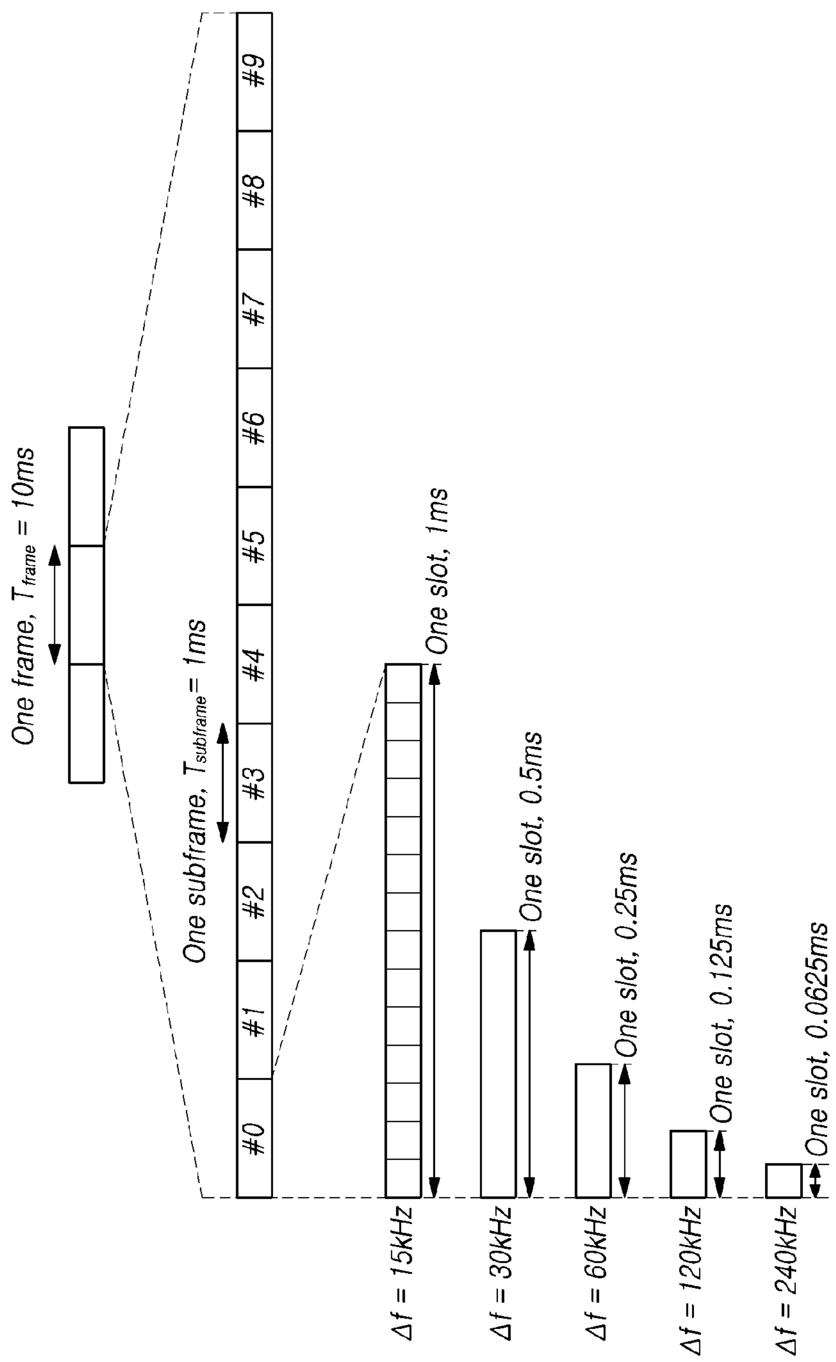
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR frame structure, a frame is defined to include 10 sub-frames each having the same length of 1 ms and has a length of 10 ms. One frame may be divided into half frames of 5 ms, and each half frame includes 5 sub-frames. In the case of a subcarrier spacing of 15 kHz, one sub-frame includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the sub-frame. On the other hand, in the case of a numerology having a subcarrier spacing of 30 kHz, the slot includes 14 OFDM symbols, but one sub-frame may include two slots each having a length of 0.5 ms. That is, the sub-frame and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
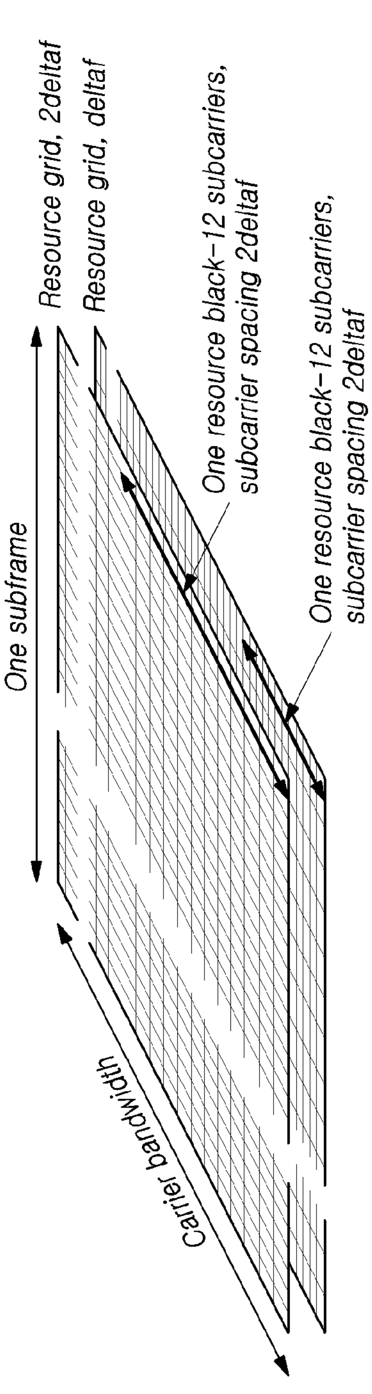
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
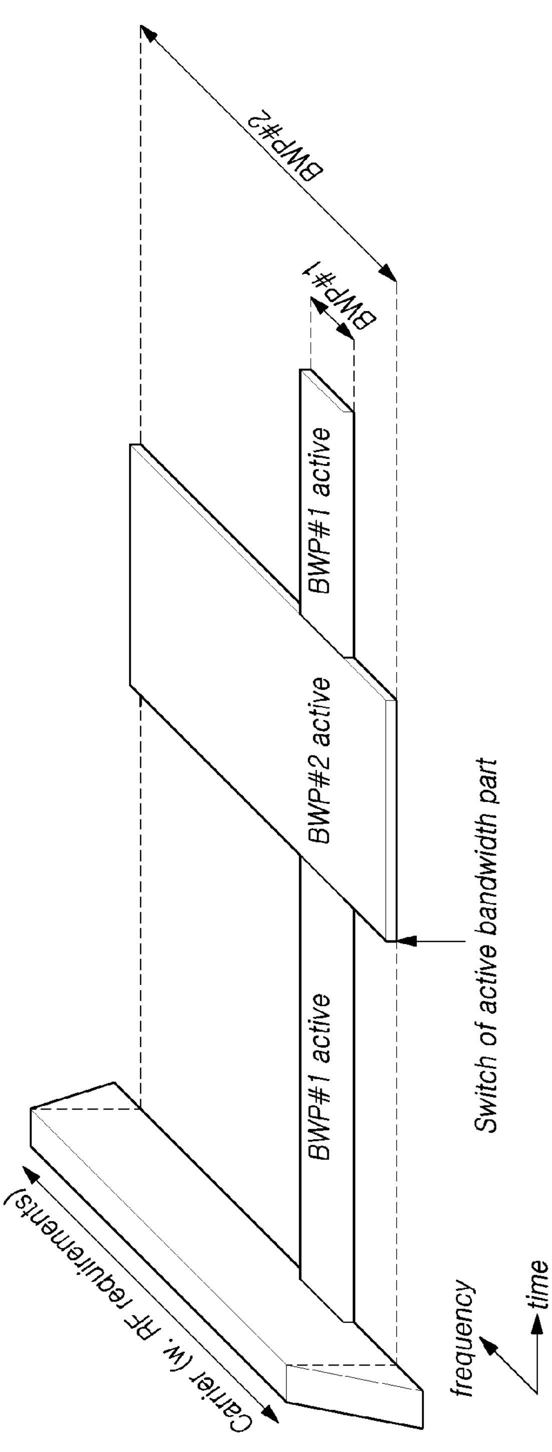
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
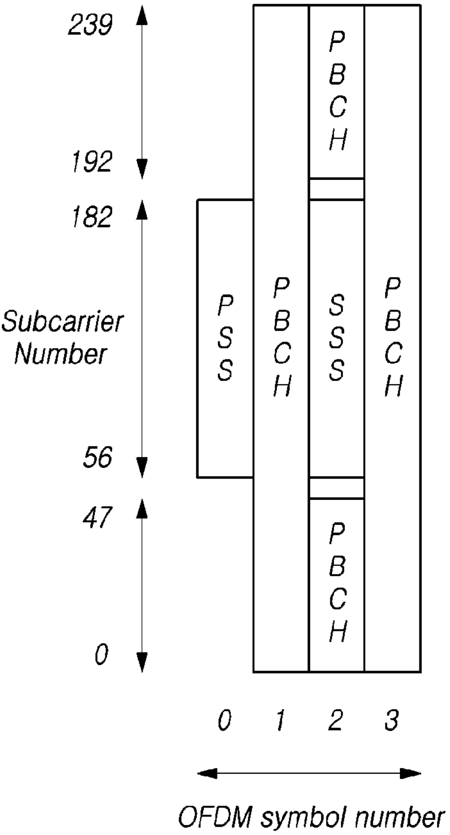
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
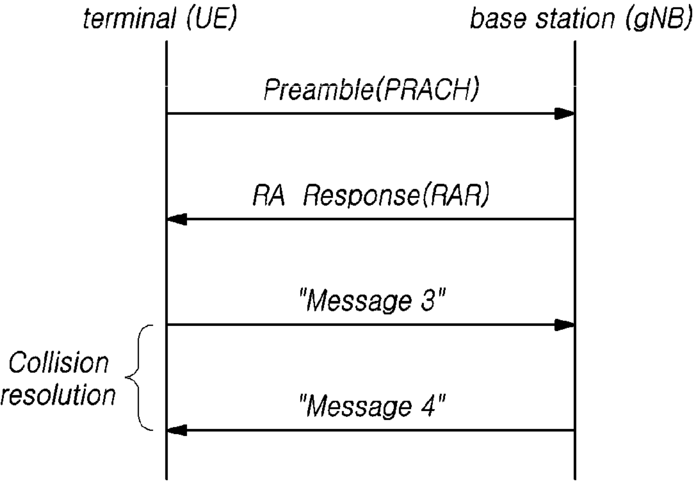
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
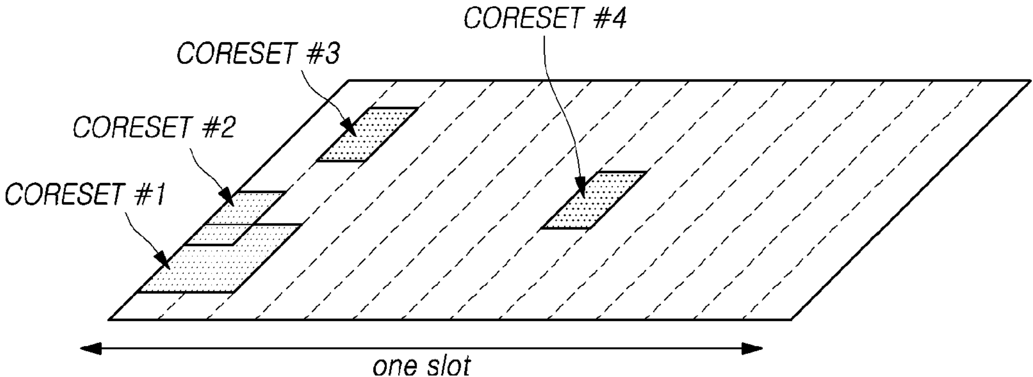
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

<NR Sidelink>

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and 11) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
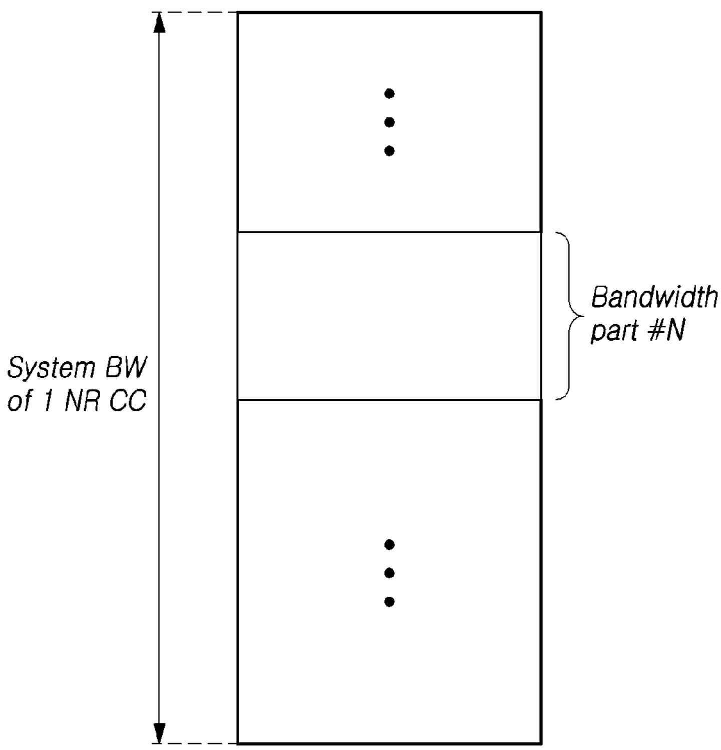
FIG. 9 is a view schematically illustrating a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Random Access Procedure

A random access is a procedure used by the UE to synchronize uplink time with the base station or to receive radio resource allocation.

The UE performs a random access procedure in the following cases.

In case of initial connection because there is no RRC connection with the base station When trying to recover in case of radio connection failure or handover failure When the UE accesses the target cell for the first time during the handover process When the uplink time synchronization is not matched or the UE requests a radio resource (UL grant)

When requested by the base station

Such a random access procedure is classified into a contention based random access procedure and a non-contention based or contention free random access procedure. The distinction between the above two schemes is determined according to whether the UE directly selects the preamble used in the random access procedure or the base station selects it.

In the non-contention based (e.g., Contention free) random access process, the UE uses a preamble allocated only to itself by the base station. That is, the base station allocates a preamble to be used by each UE for non-contention-based random access. Since the preamble allocated to each UE cannot be used by other UEs, collision does not occur.

Thereafter, the UE transmits the random access channel preamble to the base station by using the allocated preamble when the above-described random access procedure is performed. When the base station receives the random access channel preamble, the base station transmits a random access response to the corresponding UE. Upon receiving the random access response, the UE synchronizes the uplink time using a Timing Advance Command (TAC) included in the random access response and prepares to transmit uplink data to the corresponding resource according to the UL grant. As a result, the random access procedure is terminated.

In the contention-based random access procedure, the UE selects and transmits a random preamble among available preambles by itself. In this case, since the UE randomly selects a random access channel preamble, there is a possibility that several UEs select and use it at the same time. Therefore, when the base station receives the random access channel preamble, it cannot know from which UE the corresponding random access channel preamble is transmitted. Therefore, unlike the non-contention-based random access procedure, an additional process for selecting only one UE is required. Hereinafter, a contention-based random access procedure will be described in the order of FIG. 6.

1. First, the UE randomly selects one random access channel preamble from a set of random access channel preambles through the received system information, and selects and transmits a PRACH resource capable of transmitting the selected random access channel preamble. PRACH resource configuration is provided through the system information. It may be known that the PRACH resource is allocated in which subframe and period through the PRACH configuration index of the system information block 2.

2. The base station transmits a response message for one of the received random access channel preambles. The random access response is delivered within the random access response window delivered through the system information. The random access response message may include a random access channel preamble ID, an uplink radio resource (UL grant), a temporary C-RNTI, an uplink time synchronization correction value (Time Alignment Command (TAC)), and the like.

When the UE receives the random access response corresponding to the random access channel preamble transmitted by the UE, it configures the contents included in the random access response. For example, the UE applies the TAC and configures the temporary C-RNTI included in the random access response message as its own temporary C-RNTI. Then, the UE prepares to transmit a message through the received uplink radio resource. At this time, other UEs that have transmitted the same random access channel preamble through the same PRACH resource also receive the random access response, so that the above-described configuration is applied and a message 3 (Msg3) is transmitted together.

3. The UE transmits Msg3 through the received radio resource to the received temporary C-RNTI. The Msg3 includes UE-specific information such as UE-Identity.

4. The base station prepares a response message (Msg 4) for one Msg3 that has been successfully decoded received from the end. The Msg4 is configured including the UE's unique identifier (contention resolution ID=ue-Identity) included in the Msg3 and transmitted as a temporary C-RNTI.

5. Upon receiving the response message (Msg4), the UE compares the unique identifier included in the Msg4 with its own identifier. If the unique identifier included in the received Msg4 is the same as its own unique identifier, the UE considers it as a response of the Msg3 and transmits an ACK message to the base station. If the unique identifier included in the received Msg4 is not the same as its own unique identifier, the corresponding UE determines that the random access process has failed and starts the random access process again from the beginning.

Through the above process, it is possible to avoid collision of multiple UEs that transmit the same random access channel preamble through the same PRACH resource in the contention-based random access process.

Random Access Channel Preamble

A random access channel preamble used in the random access procedure will be briefly described.

A total of 64 random access channel preambles may be classified. It is largely classified into a non-dedicated random access channel preamble (Non-dedicated RA preamble) and a dedicated random access channel preamble (Dedicated RA preamble). The non-dedicated random access channel preamble is a set of preambles that may be used in the contention-based random access procedure. In addition, the dedicated random access channel preamble is a set of preambles used in the non-contention-based random access procedure. The non-dedicated random access channel preambles are further classified into Group A and Group B. The Group A and the Group B are divided according to the size and path loss of the message 3 (Msg3) in the random access procedure. The base station divides in advance the type and number of preambles that the UE can use according to the situation through the System Information Block 2 (SIB2) and allocates it.

Random Access Response

The UE that has transmitted the random access channel preamble generates an RA-RNTI according to the PRACH resource used to transmit the random access channel preamble. The UE monitors the reception of the random access response for a pre-configured random access response window (RAR window) time through the SIB2 after three subframes from the subframe in which the random access channel preamble is transmitted. In this case, the UE monitors the reception of the random access response using the above-described RA-RNTI. If the UE receives the random access response message within the response window, it adjusts its uplink time synchronization according to the TAC included in the corresponding random access response message, configures the temporary C-RNTI to its own RNTI, and prepares to transmit the above-described Msg3 according to the uplink grant using the configured temporary C-RNTI.

In the 3GPP NR, as described above, the following process is performed for base station access.

When the base station performs periodic SSB transmission in step 1, the UE performs PRACH location detection through detection of the transmitted SSB and SIB acquisition and transmits a random access channel preamble to the corresponding location in step 2. In step 3, the base station transmits the Msg2, which is a response corresponding to the received RACH preamble, and transmits timing information and PUSCH scheduling information through the corresponding message. In step 4, the UE transmits Msg3 user information through the resource indicated through the corresponding response, and in step 5, the base station releases UE information acquisition and contention through the corresponding Msg3, and starts communication.

Here, steps 2, 3, 4, and 5 are well-known 4-step RACH procedures, and a 2-step RACH procedure that combines steps 2 and 4 and steps 3 and 5 has been defined and standardized.

The reach of the SSB and RACH preamble signals in the base station access is very wide compared to the actual data coverage. This is to enable a user near the cell or out of coverage to confirm the existence of the cell, obtain channel quality, and perform an appropriate handover. However, in order to successfully transmit the actual Msg2, etc., the UE must be located much closer than the reach of the SSB and RACH preamble signal.

The present disclosure provides a method and apparatus for successfully transmitting subsequent messages even in a channel environment where the Msg2 and its subsequent messages cannot reach for coverage enhancement in the NR system. Specifically, there are provided a RACH preamble operation method for classifying the coverage enhancement supporting UE, a transmission method of coverage enhancement supporting UE, and a transmission method of a base station for coverage enhancement supporting UE in the present disclosure.

Hereinafter, a method of performing a random access procedure for the coverage enhancement will be specifically described with reference to related drawings.

Figure 10:
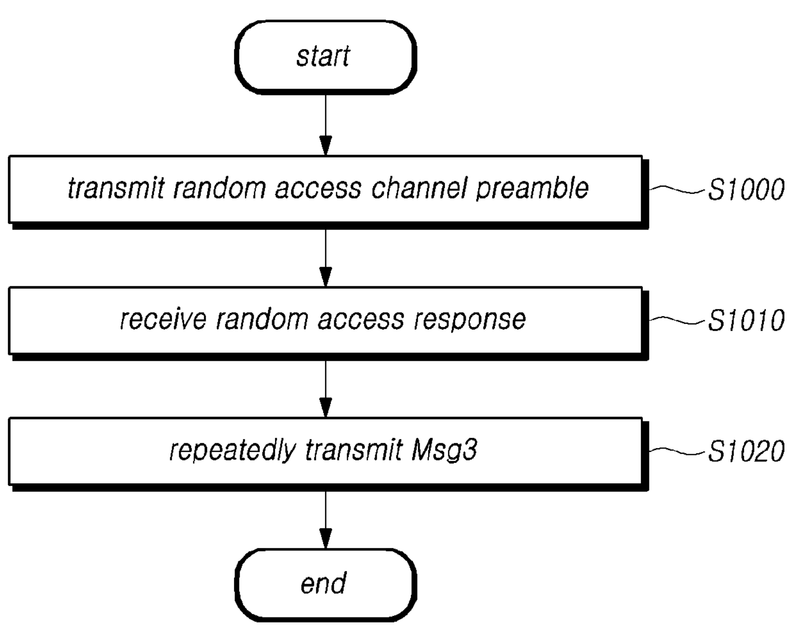
FIG. 10 is a flowchart of a method of a user equipment for performing a random access procedure for coverage enhancement according to an embodiment.

FIG. 10 is a flowchart of a method of a user equipment for performing a random access procedure for coverage enhancement according to an embodiment.

Referring to FIG. 10, the UE may transmit a random access channel preamble for repeated transmission of Msg3 through a Physical Random Access Channel (PRACH) at S1000.

In order to access the base station, the UE detects the SSB transmitted from the base station and performs PRACH location detection through SIB acquisition. Based on this, the UE transmits a random access channel preamble (RACH Preamble) through the PRACH to the base station.

As an example, when coverage enhancement is supported, the UE may transmit the separate RACH preamble for repeated transmission of the Msg3 to the base station. That is, there may be configured a new RACH preamble distinct from the RACH preamble transmitted in a general case where the repeated transmission of the Msg3 is not requested. When the RACH preamble is transmitted in a new method different from the general case, the base station may confirm that the UE that transmitted the RACH preamble is a UE that supports the coverage enhancement.

In order to transmit the RACH preamble for the repeated transmission of the Msg3, a separate PRACH resource through which only the coverage enhancement supporting UE may transmit the corresponding RACH preamble may be configured in advance.

As an example, the separate PRACH resource may be separately defined on a time/frequency resource. For example, PRACH occasions in a slot in which the RACH preamble for the repeated transmission of the Msg3 may be transmitted may be pre-configured to be distinguished from PRACH occasions in which a general RACH preamble may be transmitted. Such configuration information may be included in system information and transmitted from the base station.

In this case, for example, separately configured PRACH occasions may be configured by shifting general PRACH occasions to a predetermined value in a frequency domain or a time domain. However, this is an example and is not limited thereto, and the separately configured PRACH occasions may be configured regardless of the configuration of the general PRACH occasions.

Based on the corresponding configuration information, the UE may transmit the RACH preamble for the repeated transmission of the Msg3 based on the separately configured PRACH occasions. In other words, the random access channel preamble for the repeated transmission of Msg3 is transmitted based on a PRACH occasion that is separately configured and separated from a PRACH occasion when the Msg3 is not repeatedly transmitted. When the RACH preamble is received among the separately configured PRACH occasions, the base station may determine that the corresponding UE has requested the repeated transmission of the Msg3 for the coverage enhancement. In this case, the RACH preamble may be configured in the same way as the RACH preamble in the general case.

Alternatively, as another example, the UE may determine the RACH preamble in the form of a preamble sequence used only by the UE supporting the coverage enhancement. That is, the RACH preamble for the repeated transmission of the Msg3 may be configured based on a sequence separated from the sequence in the general case in which the Msg3 is not repeatedly transmitted.

As mentioned above, the random access channel preamble for the repeated transmission of the Msg3 may be configured based on a different sequence that is separated from a sequence when the Msg3 is not repeatedly transmitted. Based on the configuration information of the corresponding RACH preamble, the UE may configure and transmit the RACH preamble for the repeated transmission of the Msg3 based on a separate sequence. When a RACH preamble composed of the separate sequence is received among the PRACH occasions, the base station may determine that the corresponding UE has requested the repeated transmission of the Msg3 for the coverage enhancement. In this case, the PRACH occasions may be configured the same as the PRACH occasions in the general case.

As another example, the random access preamble for repeated transmission of Msg3 is configured based on a different sequence separated from the sequence in a general case where Msg3 is not repeatedly transmitted, and transmitted based on separate PRACH occasions. That is, in order to request repeated transmission of Msg3, the UE may configure the RACH preamble based on a separate sequence and transmit it based on the separately configured PRACH occasions.

As an example, the UE may determine whether to transmit the RACH preamble for repeated transmission of Msg3 based on the Reference Signal Received Power (RSRP) of the received synchronization signal. That is, in the case where the channel condition is not good, such as when the RSRP value of the synchronization signal received from the base station is smaller than a predetermined threshold, the UE determines to transmit the RACH preamble for the repeated transmission of the Msg3 in order to enhance the coverage.

Referring back to FIG. 10, the UE receives a random access response (RAR) including uplink scheduling information for the repeated transmission of the Msg3 at S1010, and repeatedly transmits the Msg3 based on the uplink scheduling information at S1020.

When the RACH preamble for the repeated transmission of the Msg3 is received, the base station may determine whether to allocate resources for the repeated transmission of the Msg3 to the UE. The base station may transmit the random access response (RAR) including information on uplink resources to be used for the repeated transmission so that the UE may repeatedly transmit the Msg3.

As an example, when allocating the resource for the repeated transmission of the Msg3, the base station may determine the number of repetitions of the Msg3. The base station may indicate the number of repetitions of the Msg3 through downlink control information. In this case, the corresponding downlink control information may be configured in DCI format 0_0 having CRC scrambled with TC (Temporary Cell)-RNTI according to an embodiment.

The base station may indicate the number of repetitions of the Msg3 through higher layer signaling such as an RRC message, or the combination through higher layer signaling and downlink control information. In other words, the number of repetitions of Msg3 may be determined depending on the PRACH preamble, or indicated by downlink control information, higher layer signaling, or a combination thereof. As mentioned below, the base station may determine the number of repetitions or the slot interval depending on the PRACH preamble, or the base station may configure it through the high layer signaling such as the RRC in advance, or the base station may designate the number of repetitions in every scheduling downlink control information such as the DCI.

As an example, the base station may determine a redundancy version (RV) related to the repeated transmission of the Msg3. The Msg3 may be configured to use RV 0 for the first iteration of the initial transmission. The base station may dynamically indicate the RV ID through DCI 0_0 with CRC scrambled by TC-RNTI for the first repetition of Msg3 retransmission.

The UE may repeatedly transmit the Msg3 using a corresponding resource according to an uplink grant included in the random access response at S1020.

The method of the UE for performing the random access procedure according to an embodiment may enhance the coverage by repeatedly transmitting the Msg3 in the random access procedure in the NR system.

Figure 11:
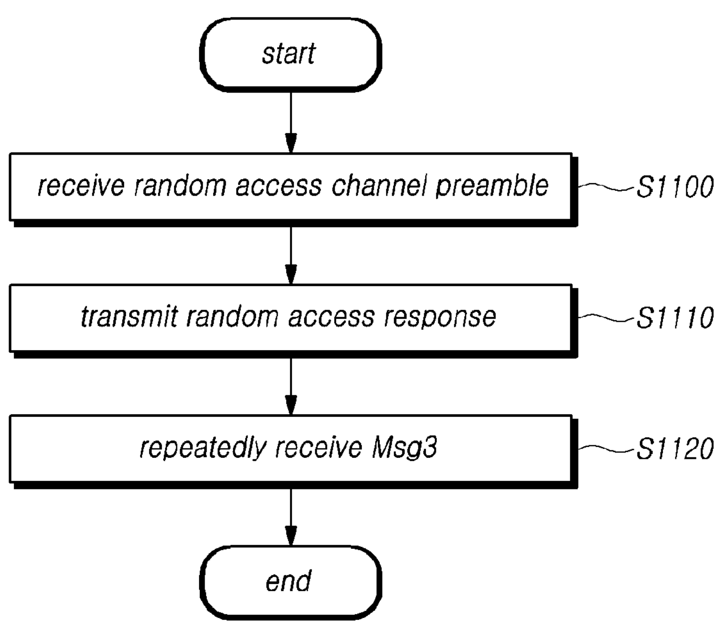
FIG. 11 is a flowchart of a method of a base station for performing a random access procedure for coverage enhancement according to an embodiment.

FIG. 11 is a flowchart of a method of a base station for performing a random access procedure for coverage enhancement according to an embodiment.

Referring to FIG. 11, the base station may receive a random access channel preamble for repeated transmission of Msg3 through a physical random access channel (PRACH) at S1100.

The base station transmits a synchronization signal and a system information. In order to access the base station, the UE detects the SSB transmitted from the base station and performs PRACH location detection through SIB acquisition. The base station receives a random access channel preamble (RACH Preamble) transmitted by the UE based on the corresponding information.

As an example, the base station may preconfigure configuration information for transmitting a separate RACH preamble for repeated transmission of Msg3 to the UE in which the coverage enhancement is supported, and transmit the configuration information to the UE. That is, there may be configured a new RACH preamble distinct from the RACH preamble transmitted in a general case where the repeated transmission of the Msg3 is not requested. That is, when the RACH preamble is transmitted from the UE in a new method different from the general case, the base station may confirm that the UE that has transmitted the RACH preamble is a UE that supports the coverage enhancement.

In order to transmit the RACH preamble for the repeated transmission of the Msg3, a separate PRACH resource through which only the coverage enhancement supporting UE may transmit the corresponding RACH preamble may be configured in advance.

As an example, a separate PRACH resource may be separately defined on a time/frequency resource. For example, PRACH occasions in a slot in which the RACH preamble for the repeated transmission of the Msg3 may be transmitted may be pre-configured to be distinguished from PRACH occasions in which a general RACH preamble may be transmitted. The base station may transmit such configuration information by including it in the system information.

In this case, for example, separately configured PRACH occasions may be configured by shifting general PRACH occasions to a predetermined value in a frequency domain or a time domain. However, this is an example, and the embodiments are not limited thereto. For example, the separately configured PRACH occasions may be configured regardless of the configuration of general PRACH occasions.

Based on the corresponding configuration information, the base station may receive the RACH preamble for the repeated transmission of the Msg3 based on the separately configured PRACH occasions. In other words, the random access channel preamble for the repeated transmission of Msg3 is transmitted based on a PRACH occasion that is separately configured from a typical PRACH occasion that is configured to not repeatedly transmitting the Msg3. When the RACH preamble is received among the separately configured PRACH occasions, the base station may determine that the corresponding UE has requested the repeated transmission of the Msg3 for the coverage enhancement. In this case, the RACH preamble may be configured in the same way as the RACH preamble in the general case.

Alternatively, as another example, the UE may determine the RACH preamble in the form of a preamble sequence used only by the UE supporting the coverage enhancement. That is, the RACH preamble for the repeated transmission of the Msg3 may be configured based on a sequence different from the sequence in the general case in which Msg3 is not repeatedly transmitted.

As mentioned above, the random access channel preamble for the repeated transmission of the Msg3 may be configured based on a different sequence that is separated from a sequence when the Msg3 is not repeatedly transmitted. Based on the configuration information of the corresponding RACH preamble, the base station may receive the RACH preamble for the repeated transmission of the Msg3 configured based on a separate sequence. When a RACH preamble composed of a separate sequence is received among the PRACH occasions, the base station may determine that the corresponding UE has requested repeated transmission of Msg3 for coverage enhancement. In this case, the PRACH occasions may be configured the same as the PRACH occasions in the general case.

As another example, the random access preamble for repeated transmission of Msg3 is configured based on a different sequence separated from the sequence in a general case where Msg3 is not repeatedly transmitted, and transmitted based on separate PRACH occasions. That is, in order to request repeated transmission of Msg3, the UE may configure the RACH preamble based on a separate sequence and transmit it based on the separately configured PRACH occasions.

As an example, the UE may determine whether to transmit the RACH preamble for repeated transmission of Msg3 based on the Reference Signal Received Power (RSRP) of the received synchronization signal. That is, in the case where the channel condition is not good, such as when the RSRP value of the synchronization signal received from the base station is smaller than a predetermined threshold, the UE determines to transmit the RACH preamble for the repeated transmission of the Msg3 in order to enhance the coverage.

Referring back to FIG. 11, the base station transmits a random access response (RAR) including uplink scheduling information for repeated transmission of Msg3 at S1110, and repeatedly receives Msg3 based on the uplink scheduling information at S1120.

When the RACH preamble for the repeated transmission of the Msg3 is received, the base station may determine whether to allocate resources for the repeated transmission of the Msg3 to the UE. The base station may transmit the random access response (RAR) including information on uplink resources to be used for the repeated transmission so that the UE may repeatedly transmit the Msg3.

As an example, when allocating a resource for repeated transmission of the Msg3, the base station may determine the number of repetitions of the Msg3. The base station may indicate the number of repetitions of the Msg3 through downlink control information. In this case, as an example, the corresponding downlink control information may be configured in DCI format 00 having CRC scrambled with TC (Temporary Cell)-RNTI.

The base station may indicate the number of repetitions of the Msg3 through higher layer signaling such as an RRC message, or the combination through higher layer signaling and downlink control information. In other words, the number of repetitions of Msg3 may be determined depending on the PRACH preamble, or indicated by downlink control information, higher layer signaling, or a combination thereof. As mentioned below, the base station may determine the number of repetitions or the slot interval depending on the PRACH preamble, or the base station may configure it through the high layer signaling such as the RRC in advance, or the base station may designate the number of repetitions in every scheduling downlink control information such as the DCI.

As an example, the base station may determine a redundancy version (RV) related to the repeated transmission of the Msg3. The Msg3 may be configured to use RV 0 for the first iteration of the initial transmission. The base station may dynamically indicate the RV ID through DCI 0_0 with CRC scrambled by TC-RNTI for the first repetition of Msg3 retransmission.

The base station may repeatedly receive the Msg3 using a corresponding resource according to an uplink grant included in the random access response at S1120.

The method of the base station for performing the random access procedure according to an embodiment may enhance the coverage by repeatedly transmitting Msg3 in a random access procedure in the NR system.

Hereinafter, each embodiment related to a method of performing a random access procedure for coverage enhancement in the NR system will be described in detail with reference to related drawings. The embodiments described below may be applied individually or in any combination.

In the present disclosure, for the coverage enhancement in the NR system, (1) a RACH preamble operation method for classifying a coverage enhancement supporting UE, (2) a transmission method of a coverage enhancement supporting UE, and (3) transmission of a base station for a coverage enhancement supporting UE method may be provided.

Embodiment 1. RACH Preamble Operation Method for Classifying a Coverage Enhancement Supporting UE This embodiment is a method of operating the RACH preamble so that the base station receiving the random access channel preamble signal can be aware of that the transmitting UE is a coverage enhancement supporting UE. This embodiment may be divided into a transmission resource for transmitting the RACH preamble or a transmission method for transmitting the RACH preamble. Specifically, the following methods may be used.

① A Method of Defining a Separate PRACH Resource for the Coverage Enhancement Supporting UE The method is to configure in advance a separate PRACH resource for only a UE supporting the coverage enhancement to transmit the RACH preamble. As an example, the separate PRACH resource may be separately defined on a time/frequency resource. Alternatively, the RACH preamble may be determined in the form of a preamble sequence used only by a coverage enhancement supporting UE. This method is described above in view of the UE and the bases station in reference FIGS. 10 and 11

② A Method of Introducing a Separate PRACH Preamble Transmission Method to a UE Supporting the Coverage Enhancement This method is a method for enabling a UE supporting the coverage enhancement to transmit the PRACH preamble in a different form from that of other UEs. For example, the coverage enhancement supporting UE may transmit a plurality of identical or regularly changing preamble sequences with a predetermined period. The base station may detect this pattern when receiving the PRACH preamble and determine that the corresponding UE is a coverage enhancement supporting UE.

Embodiment 2. Transmission Method of the Coverage Enhancement Supporting UE

This embodiment is a method that enables successful control/data message transmission when the coverage enhancement supporting UE is outside the typical coverage. This includes repeated transmission of the same or equivalent signal, and the corresponding repetition pattern may be agreed in advance. In this regard, there are a method of repeatedly transmitting to another resource in the time axis and a method of repeatedly transmitting to another resource in the frequency axis.

① A Method for Repeatedly Transmitting to Other Resources in the Time Axis

In this method, when the coverage enhancement supporting UE performs all transmissions, the same or equivalent signal is transmitted again in the next slot or a slot spaced apart by a pre-configured distance. To this end, the base station may determine the number of repetitions or the slot interval depending on the PRACH preamble, or the base station may configure it through the high layer signaling such as the RRC in advance, or the base station may designate the number of repetitions in every scheduling downlink control information such as the DCI. When configured in the DCI, this may be configured as a separate field or may be included as a parameter in a Time Domain Resource Allocation (TDRA) table defined for a corresponding UE. This DCI may be scrambled with a newly introduced RNTI so that only a coverage enhancement user may receive it.

② A Method for Repeatedly Transmitting to Other Resources on the Frequency Axis

In this method, when the coverage enhancement supporting UE performs all transmissions, the same or equivalent signals are repeatedly transmitted in different bands. To this end, the base station may determine the number of repetitions of the Msg3 depending on the PRACH preamble, or the base station may configure it in advance through the high layer signaling such as the RRC or the like, or the base station may configure it for every DCI. In addition, a frequency band allocated during the DCI scheduling may be allocated in consideration of both transmissions. That is, the UE may divide the allocated resources using a certain rule and transmit the same or equivalent signals to each resource by overlapping them. This DCI may likewise be scrambled with a newly introduced RNTI so that only a coverage enhancement user may receive it.

Embodiment 3. Transmission Method of a Base Station for the Coverage Enhancement Supporting UE This embodiment is a method that enables successful control/data message reception when the coverage enhancement supporting UE is outside the conventional coverage. This method also includes repeated transmission of the same or equivalent signal as in the UE transmission, and the corresponding repetition pattern of the Msg3 may be agreed in advance. Broadly, there are a method of repeatedly transmitting to other resources in the time axis and a method of repeatedly transmitting to other resources in the frequency axis. As for the specific methods, the same types of methods as 1 and 2 of the above-described embodiment 2 may be used.

The methods provided in the present disclosure may be applied independently, or may be operated in combination in any form. In addition, in the case of a new term, an arbitrary name that is easy to understand the meaning of the term used in the present disclosure is used, and the invention of the present disclosure can be applied even when other terms having the same meaning are actually used.

Hereinafter, detailed description will be made with respect to the hardware structure of the UE and the base station being capable of implementing some or all of the embodiments as described with reference to FIGS. 1 to 11.

Figure 12:
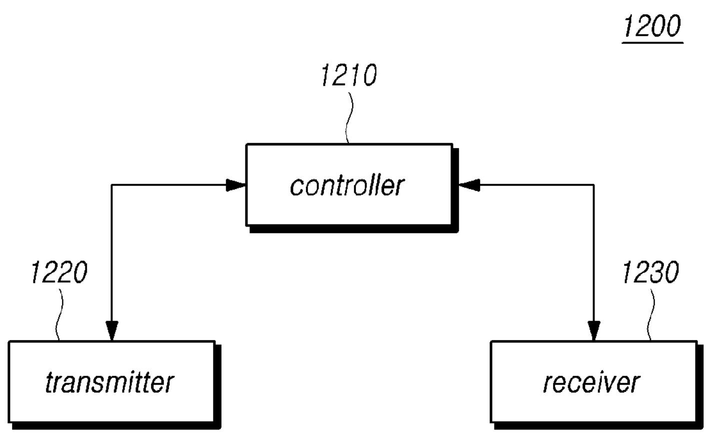
FIG. 12 is a view showing a user equipment according to an embodiment.

FIG. 12 is a diagram showing a UE 1200 according to an embodiment.

Referring now to FIG. 12, the UE 1200 according to the embodiment may include a controller 1210, a transmitter 1220, and a receiver 1230.

The controller 1210 may be a set of at least one processors and control the overall operation of the UE 1200 according to the method for performing a random access procedure for coverage enhancement by the UE required to carry out the disclosed invention. The transmitter 1220 may be a circuitry and transmit uplink control information, data, and messages to a base station through a corresponding channel, and transmit sidelink control information, data, and messages to other UE through a corresponding channel. The receiver 1230 may be a circuitry and receive downlink control information, data, and messages from the base station through a corresponding channel, and receive sidelink control information, data, and messages from other UE through a corresponding channel.

The transmitter 1220 may transmit a random access channel preamble for repeated transmission of Msg3 through a Physical Random Access Channel (PRACH).

The controller 1210 and the receiver 1230 detect the SSB transmitted from the base station to access the base station, and perform PRACH location detection through SIB acquisition. Based on this, the transmitter 1220 transmits the random access channel preamble (RACH Preamble) to the base station.

As an example, when coverage enhancement is supported, the transmitter 1220 may transmit the separate RACH preamble for repeated transmission of the Msg3 to the base station. That is, there may be configured a new RACH preamble distinct from the RACH preamble transmitted in a general case where the repeated transmission of the Msg3 is not requested. When the RACH preamble is transmitted in a new method different from the general case, the base station may confirm that the UE that transmitted the RACH preamble is a UE that supports the coverage enhancement.

In order to transmit the RACH preamble for the repeated transmission of the Msg3, a separate PRACH resource for only the coverage enhancement supporting UE to transmit the corresponding RACH preamble may be configured in advance.

As an example, the separate PRACH resource may be separately defined on a time/frequency resource. For example, PRACH occasions in a slot for transmitting the RACH preamble for the repeated transmission of the Msg3 may be pre-configured to be distinguished from PRACH occasions for transmitting a general RACH preamble. Such configuration information may be included in system information and transmitted from the base station.

Based on the corresponding configuration information, the transmitter 1220 may transmit the RACH preamble for the repeated transmission of the Msg3 based on the separately configured PRACH occasions. In other words, the random access channel preamble for the repeated transmission of Msg3 is transmitted based on a PRACH occasion that is separately configured. The separately configured PRACH occasion is separated from a typical PRACH occasion that is configured not to repeatedly transmit the Msg3. When the RACH preamble is received among the separately configured PRACH occasions, the base station may determine that the corresponding UE has requested the repeated transmission of the Msg3 for the coverage enhancement. In this case, the RACH preamble may be configured in the same way as the RACH preamble in the general case.

Alternatively, as another example, the controller 1210 may determine the RACH preamble in the form of a preamble sequence used only by the UE supporting the coverage enhancement. That is, the RACH preamble for the repeated transmission of the Msg3 may be configured based on a sequence separated from the sequence in the general case in which the Msg3 is not repeatedly transmitted.

As mentioned above, the random access channel preamble for the repeated transmission of the Msg3 may be configured based on a different sequence that is separated from a sequence when the Msg3 is not repeatedly transmitted. Based on the configuration information of the corresponding RACH preamble, the transmitter 1220 may configure and transmit the RACH preamble for the repeated transmission of the Msg3 based on a separate sequence. When a RACH preamble composed of the separate sequence is received among the PRACH occasions, the base station may determine that the corresponding UE has requested the repeated transmission of the Msg3 for the coverage enhancement. In this case, the PRACH occasions may be configured the same as the PRACH occasions in the general case.

As another example, the random access preamble for repeated transmission of Msg3 is configured based on a different sequence separated from the sequence in a general case where Msg3 is not repeatedly transmitted, and the configured random access preamble is transmitted based on separate PRACH occasions. That is, in order to request repeated transmission of Msg3, the UE may configure the RACH preamble based on a separate sequence and transmit it based on the separately configured PRACH occasions.

As an example, the controller 1210 may determine whether to transmit the RACH preamble for repeated transmission of Msg3 based on the Reference Signal Received Power (RSRP) of the received synchronization signal. That is, in the case where the channel condition is not good, such as when the RSRP value of the synchronization signal received from the base station is smaller than a predetermined threshold, the controller 1210 may determine to transmit the RACH preamble for the repeated transmission of the Msg3 in order to enhance the coverage.

The receiver 1230 may receive a random access response (RAR) including uplink scheduling information for the repeated transmission of the Msg3. The transmitter 1220 may repeatedly transmit the Msg3 based on the uplink scheduling information.

When the RACH preamble for the repeated transmission of the Msg3 is received, the base station may determine whether to allocate resources for the repeated transmission of the Msg3 to the UE. The base station may transmit the random access response (RAR) including information on uplink resources to be used for the repeated transmission so that the UE may repeatedly transmit the Msg3.

As an example, the receiver 1230 may receive the number of repetitions of the Msg3 determined by the base station through downlink control information. In this case, according to an example, the corresponding downlink control information may be configured in DCI format 0_0 having CRC scrambled with TC (Temporary Cell)-RNTI.

The receiver 1230 may receive the number of repetitions of the Msg3 determined by the base station through higher layer signaling such as an RRC message, or the combination through higher layer signaling and downlink control information. In other words, the number of repetitions of Msg3 may be determined depending on the PRACH preamble, or indicated by downlink control information, higher layer signaling, or a combination thereof.

When the base station may determine a redundancy version (RV) related to the repeated transmission of the Msg3, the Msg3 may be configured to use RV 0 for the first iteration of the initial transmission. The receiver 1230 may dynamically receive the RV ID through DCI 0_0 with CRC scrambled by TC-RNTI for the first repetition of Msg3 retransmission.

The transmitter 1220 may repeatedly transmit the Msg3 using a corresponding resource according to an uplink grant included in the random access response.

The UE for performing the random access procedure according to an embodiment may enhance the coverage by repeatedly transmitting the Msg3 in the random access procedure in the NR system.

Figure 13:
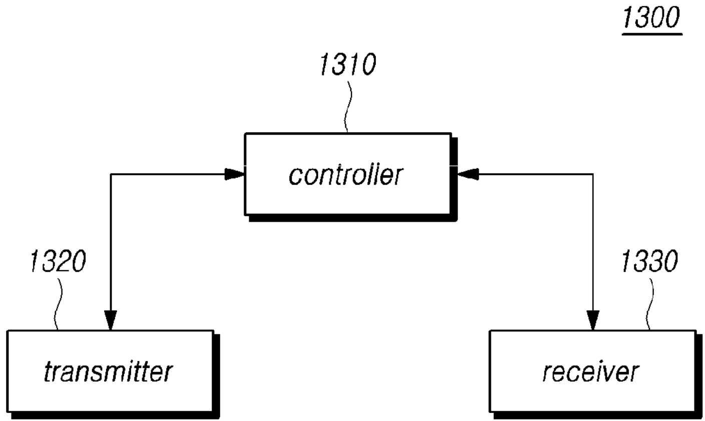
FIG. 13 is a view showing a base station according to an embodiment.

FIG. 13 is a diagram showing a base station 1300 according to an embodiment.

Referring now to FIG. 13, the base station 1300 according to the embodiment may include a controller 1310, a transmitter 1320, and a receiver 1330.

The controller 1310 may be a set of at least one processors and control the overall operation of the base station 1300 according to the above-described method required for the base station to perform a random access procedure for coverage enhancement. The transmitter 1320 and the receiver 1330 may be circuitries and transmit/receive signals, messages, and data necessary to carry out the disclosed invention to and from the UE.

The receiver 1330 may receive a random access channel preamble for repeated transmission of Msg3 through a Physical Random Access Channel (PRACH).

The transmitter 1320 transmits a synchronization signal and a system information. In order to access the base station, the UE detects the SSB transmitted from the base station and performs PRACH location detection through SIB acquisition. The receiver 1330 receives a random access channel preamble (RACH Preamble) transmitted by the UE based on the corresponding information.

As an example, the controller 1310 may preconfigure configuration information for transmitting a separate RACH preamble for repeated transmission of Msg3 to the UE supporting the coverage enhancement, and the transmitter 1320 may transmit the configuration information to the UE. That is, there may be configured a new RACH preamble distinct from the RACH preamble transmitted in a general case where the repeated transmission of the Msg3 is not requested. That is, when the RACH preamble is transmitted from the UE in a new method different from the general case, the base station may confirm that the UE that has transmitted the RACH preamble is a UE that supports the coverage enhancement.

In order to transmit the RACH preamble for the repeated transmission of the Msg3, a separate PRACH resource may be configured in advance for only the coverage enhancement supporting UE to transmit the corresponding RACH preamble.

As an example, a separate PRACH resource may be separately defined on a time/frequency resource. For example, PRACH occasions in a slot for transmitting the RACH preamble for the repeated transmission of the Msg3 may be pre-configured to be distinguished from PRACH occasions in which a general RACH preamble may be transmitted. The base station may transmit such configuration information by including it in the system information.

Based on the corresponding configuration information, the receiver 1330 may receive the RACH preamble for the repeated transmission of the Msg3 based on the separately configured PRACH occasions. In other words, the random access channel preamble for the repeated transmission of Msg3 is transmitted based on a PRACH occasion that is separately configured from a typical PRACH occasion for not repeatedly transmitting the Msg3. When the RACH preamble is received among the separately configured PRACH occasions, the controller 1310 may determine that the corresponding UE has requested the repeated transmission of the Msg3 for the coverage enhancement. In this case, the RACH preamble may be configured in the same way as the RACH preamble in the general case.

Alternatively, as another example, the UE may determine the RACH preamble in the form of a preamble sequence used only by the UE supporting the coverage enhancement. That is, the RACH preamble for the repeated transmission of the Msg3 may be configured based on a sequence different from the sequence in the general case in which Msg3 is not repeatedly transmitted.

As mentioned above, the random access channel preamble for the repeated transmission of the Msg3 may be configured based on a different sequence that is separated from a sequence when the Msg3 is not repeatedly transmitted. Based on the configuration information of the corresponding RACH preamble, the receiver 1330 may receive the RACH preamble for the repeated transmission of the Msg3 configured based on a separate sequence. When a RACH preamble composed of a separate sequence is received among the PRACH occasions, the controller 1310 may determine that the corresponding UE has requested repeated transmission of Msg3 for coverage enhancement. In this case, the PRACH occasions may be configured the same as the PRACH occasions in the general case.

As another example, the random access preamble for repeated transmission of Msg3 is configured based on a different sequence separated from the sequence in a general case where Msg3 is not repeatedly transmitted, and the configured random access preamble is transmitted based on separate PRACH occasions. That is, in order to request repeated transmission of Msg3, the UE may configure the RACH preamble based on a separate sequence and transmit it based on the separately configured PRACH occasions.

As an example, the UE may determine whether to transmit the RACH preamble for repeated transmission of Msg3 based on the Reference Signal Received Power (RSRP) of the received synchronization signal. That is, in the case where the channel condition is not good, such as when the RSRP value of the synchronization signal received from the base station is smaller than a predetermined threshold, the UE determines to transmit the RACH preamble for the repeated transmission of the Msg3 in order to enhance the coverage.

The transmitter 1320 may transmit a random access response (RAR) including uplink scheduling information for repeated transmission of Msg3. The receiver 1330 may repeatedly receive Msg3 based on the uplink scheduling information at S1120.

When the RACH preamble for the repeated transmission of the Msg3 is received, the controller 1310 may determine whether to allocate resources for the repeated transmission of the Msg3 to the UE. The transmitter 1320 may transmit the random access response (RAR) including information on uplink resources to be used for the repeated transmission so that the UE may repeatedly transmit the Msg3.

As an example, when allocating a resource for repeated transmission of the Msg3, the base station may determine the number of repetitions of the Msg3. The transmitter 1320 may indicate the number of repetitions of the Msg3 through downlink control information. In this case, as an example, the corresponding downlink control information may be configured in DCI format 0_0 having CRC scrambled with TC (Temporary Cell)-RNTI.

The transmitter 1320 may indicate the number of repetitions of the Msg3 through higher layer signaling such as an RRC message, or the combination through higher layer signaling and downlink control information. In other words, the number of repetitions of Msg3 may be determined depending on the PRACH preamble, or indicated by downlink control information, higher layer signaling, or a combination thereof. As mentioned below, the controller 1310 may determine the number of repetitions or the slot interval depending on the PRACH preamble, or the controller 1310 may configure it through the high layer signaling such as the RRC in advance, or the controller 1310 may designate the number of repetitions in every scheduling downlink control information such as the DCI.

As an example, the controller 1310 may determine a redundancy version (RV) related to the repeated transmission of the Msg3. The Msg3 may be configured to use RV 0 for the first iteration of the initial transmission. The transmitter 1320 may dynamically indicate the RV ID through DCI 0_0 with CRC scrambled by TC-RNTI for the first repetition of Msg3 retransmission.

The receiver 1330 may repeatedly receive the Msg3 using a corresponding resource according to an uplink grant included in the random access response.

The base station for performing the random access procedure according to an embodiment may enhance the coverage by repeatedly transmitting Msg3 in a random access procedure in the NR system.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents configured forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms “system”, “processor”, “controller”, “component”, “module”, “interface”, “model”, “unit”, and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of A method of a user equipment (UE) for performing a random access procedure for coverage enhancement, the method comprising:
- determining, for a random access procedure, whether message 3 (Msg3) is to be transmitted with repetitions or without repetition;
- determining to transmit a random access channel preamble (RACH Preamble) for repeated transmission of message 3 (Msg3) when Reference Signal Received Power (RSRP) of a received synchronization signal is smaller than a predetermined threshold and the Msg3 is to be transmitted with repetitions;
- transmitting the random access channel preamble for the repeated transmission of the Msg3 through a Physical Random Access Channel (PRACH);
- receiving a random access response (RAR) including uplink scheduling information for the repeated transmission of the Msg3; and
- repeatedly transmitting the Msg3 based on the uplink scheduling information,
- wherein a number of repetitions of the Msg3 is indicated by a combination of downlink control information and higher layer signaling, the downlink control information being configured in DCI format 00 having CRC scrambled with TC (Temporary Cell)-RNTI,
- wherein the DCI format 0_0 indicates a redundancy version (RV) ID, and the RV ID is a value of 0 for first repetition of the Msg3,
- wherein the random access channel preamble for the repeated transmission of the Msg3 is configured based on a different sequence that is separated from a sequence for not repeatedly transmitting the Msg3,
- wherein the random access channel preamble for the repeated transmission of Msg3 is transmitted repeatedly within a predetermined period for informing the base station of the repeated transmission of Msg3, and
- wherein, when the Msg3 is not transmitted with repetitions, the random access channel preamble is transmitted on a first PRACH occasion configured for non-repeated Msg3, and when the Msg3 is transmitted with repetitions, the random access channel preamble is transmitted on a second PRACH occasion that is different from the first PRACH occasion and configured exclusively for repeated transmission of Msg3, the second PRACH occasion not being used when Msg3 is transmitted without repetition.

2. A method of a base station for performing a random access procedure for coverage enhancement, the method comprising:
- receiving a random access channel preamble (RACH Preamble) for repeated transmission of message 3 (Msg3) through a Physical Random Access Channel (PRACH);
- transmitting a random access response (RAR) including uplink scheduling information for the repeated transmission of the Msg3; and
- repeatedly receiving the Msg3 based on the uplink scheduling information,
- wherein a number of repetitions of the Msg3 is indicated by a combination of downlink control information and higher layer signaling, the downlink control information being configured in DCI format 00 having CRC scrambled with TC (Temporary Cell)-RNTI,
- wherein the DCI format 0_0 indicates a redundancy version (RV) ID, and the RV ID is a value of 0 for first repetition of the Msg3, wherein the random access channel preamble for the repeated transmission of the Msg3 is transmitted by a user equipment (UE) when Reference Signal Received Power (RSRP) of a received synchronization signal is smaller than a predetermined threshold,
- wherein the random access channel preamble for the repeated transmission of the Msg3 is configured based on a different sequence that is separated from a sequence for not repeatedly transmitting the Msg3,
- wherein the random access channel preamble for the repeated transmission of Msg3 is received repeatedly within a predetermined period for informing the base station of the repeated transmission of Msg3, and
- wherein, when the Msg3 is not transmitted with repetitions, the random access channel preamble is received on a first, typical PRACH occasion configured for non-repeated Msg3, and when the Msg3 is transmitted with repetitions, the random access channel preamble is received on a second PRACH occasion that is different from the first PRACH occasion and configured exclusively for repeated transmission of Msg3, the second PRACH occasion not being used when Msg3 is transmitted without repetition.

3. A user equipment (UE) for performing a random access procedure for coverage enhancement, the user equipment comprising:
- a transmitter configured to transmit a random access channel preamble (RACH Preamble) for repeated transmission of message 3 (Msg3) through a Physical Random Access Channel (PRACH);
- a receiver configured to receive a random access response (RAR) including uplink scheduling information for the repeated transmission of the Msg3; and
- a controller configured to control an operation of the transmitter and the receiver,
- wherein the transmitter repeatedly transmits the Msg3 based on the uplink scheduling information,
- wherein a number of repetitions of the Msg3 is indicated by a combination of downlink control information and higher layer signaling, the downlink control information being configured in DCI format 0_0 having CRC scrambled with TC (Temporary Cell)-RNTI, wherein the DCI format 0_0 indicates a redundancy version (RV) ID, and the RV ID is a value of 0 for first repetition of the Msg3, wherein the controller is configured to determine, for a random access procedure, whether Msg3 is to be transmitted with repetitions or without repetition;

wherein the controller determines to transmit the random access channel preamble for the repeated transmission of the Msg3 when Reference Signal Received Power (RSRP) of a received synchronization signal is smaller than a predetermined threshold, wherein the random access channel preamble for the repeated transmission of the Msg3 is configured based on a different sequence that is separated from a sequence for not repeatedly transmitting the Msg3, wherein the random access channel preamble for the repeated transmission of Msg3 is transmitted repeatedly within a predetermined period for informing the base station of the repeated transmission of Msg3, and wherein, when the Msg3 is not transmitted with repetitions, the random access channel preamble is transmitted on a first PRACH occasion configured for non-repeated Msg3, and when the Msg3 is transmitted with repetitions, the random access channel preamble is transmitted on a second PRACH occasion that is different from the first PRACH occasion and configured exclusively for repeated transmission of Msg3, the second PRACH occasion not being used when Msg3 is transmitted without repetition.

* * * * *